United States Patent [19]

Fortado, Jr.

[11] 3,802,084
[45] Apr. 9, 1974

[54] INDICATING DEVICE
[76] Inventor: Fred L. Fortado, Jr., 1735 Plaza Blvd., Apt. 12, National City, Calif. 92050
[22] Filed: Jan. 13, 1972
[21] Appl. No.: 217,613

[52] U.S. Cl. .............................. 33/172 D, 33/185 R
[51] Int. Cl. ............................................ G01b 5/25
[58] Field of Search........ 33/185 R, 181 R, 172 DB, 33/169 D

[56] References Cited
UNITED STATES PATENTS
1,295,103  2/1919  Boisvert .......................... 33/172 D
1,108,697  8/1914  Cash ............................... 33/172 B
1,365,779  1/1921  Grove .............................. 33/148 F
1,436,111  11/1922 Reich .............................. 33/172 B
2,647,324  8/1953  Welch .............................. 33/172 B Primary Examiner—William D. Martin, Jr.
Attorney, Agent, or Firm—Brown & Martin

[57] ABSTRACT

A device for indicating the center of a hole or for indicating a point, line, etc., the device including a pointer and an element having a pointed end, the pointer and the element being interconnected for effecting oscillatory movements relative to one another. The device may have an indicator dial for direct reading or a fixed pointer for layout work.

1 Claim, 4 Drawing Figures

3,802,084

INDICATING DEVICE

BACKGROUND OF THE INVENTION

1. Field of the Invention

The field includes indicating gauges such as center-of-hole locating gauges and indicators for determining a position such as a line or point or laying out of lines from hole centers or edges or other lines or it can be adapted to height gauges for inspection work or machines for picking up layout work or centers of holes to edge work, or centering machine cutters for work on laid out parts or centering work pieces on machines for additional machining.

2. Description of the Prior Art

The patent to Gaylord U.S. Pat. No. 2,994,131 discloses a hole-centering tool with a pointed head, which head is placed in the hole to be centered. The mechanism there employed is more complicated than that of the present invention.

SUMMARY OF THE INVENTION

The device comprises a frame having two plates held in spaced relationship with a pointer disposed for oscillatory movement between the plates. An element having a pointed end is also disposed for oscillatory movement between the plates. The pointer and the element are interconnected with one another for effecting oscillatory movements relative to one another.

Other features and the advantages of the present invention will be apparent from the following description, reference being made to the accompanying drawing wherein a preferred embodiment of the invention is illustrated.

DESCRIPTION OF THE PREFERRED EMBODIMENT

Figure 1:
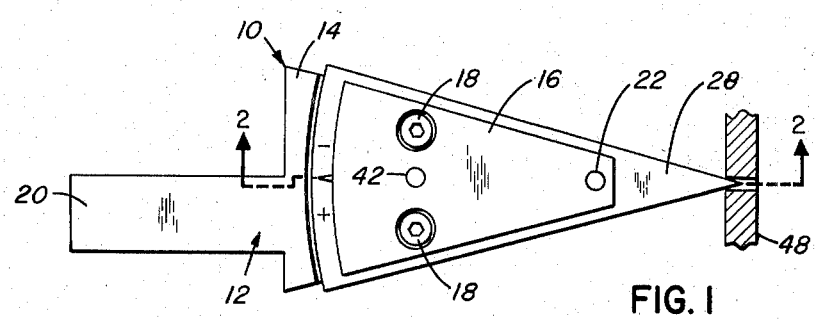
FIG. 1 is a top plan view of the device.
Figure 2:
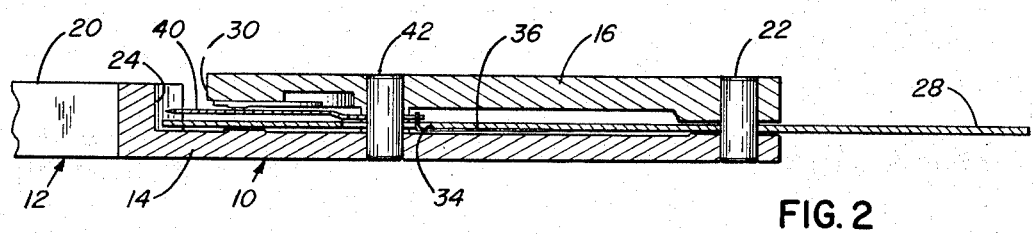
FIG. 2 is a sectional view taken along line 2—2 of FIG. 1, but on a larger scale.
Figure 3:
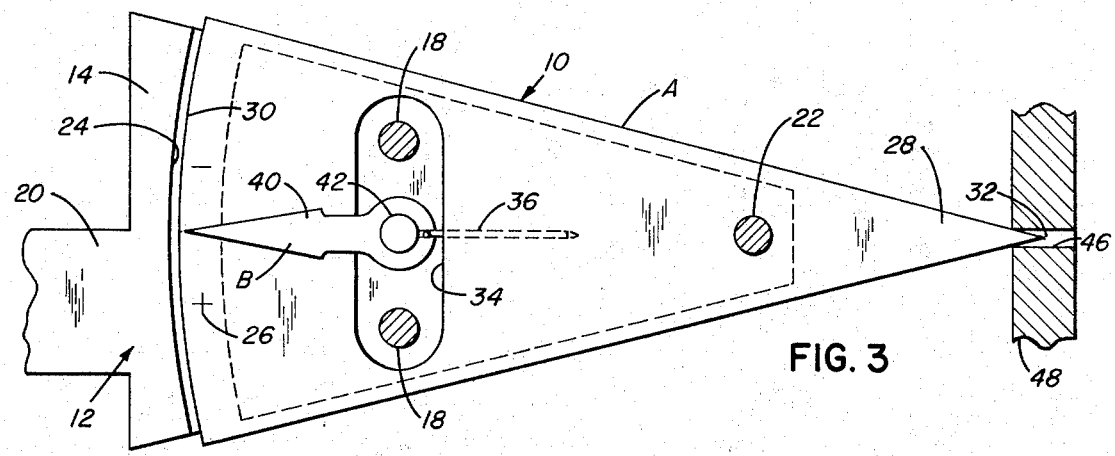
FIG. 3 is a top plan view of the device with one of the plates of the frame removed.
Figure 4:
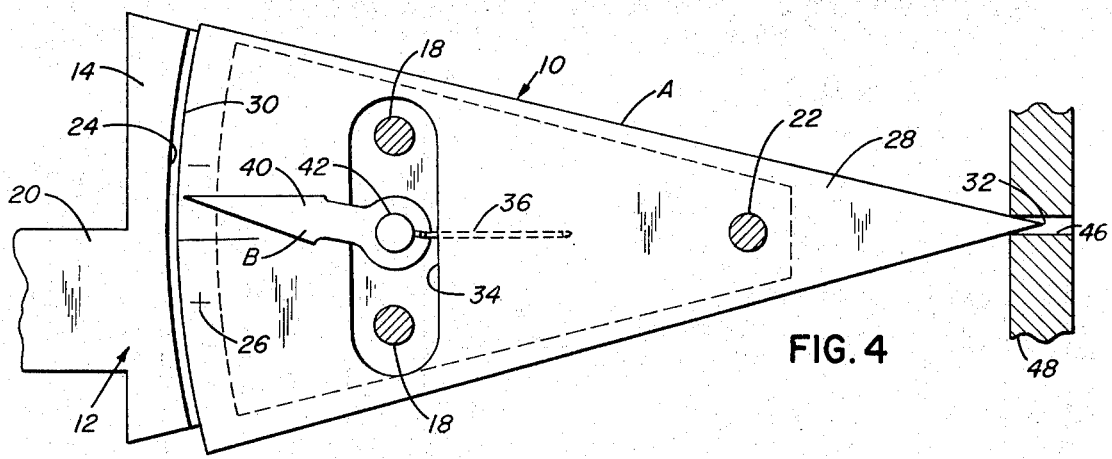
FIG. 4 is a view similar to FIG. 3, but showing different angular positions of the pointer and pointed element relative to the frame.

The device 10 comprises a frame 12 which includes two plates, which for purpose of simplicity will be referred to hereinafter as base plate 14 and top plate 16. These plates are secured to one another in spaced relationship by two suitable fastening members 18. The base plate 14 includes an extension 20 which may be engaged by or connected with a height gauge or any element for actuating or actuated by the device 10. The base plate 14 is undercut about the axis of a pin 22 which is fixed to the plates 14 and 16. The undercut forms a shoulder 24. Axially disposed indicia 26 in the form of lines is formed in the plate 14 adjacent the shoulder.

An element 28, in the form of a segment of a circle, is disposed between plates 14 and 16 and is pivotally carried by the pin 22. As viewed in the drawing, the left end 30 of the element 28 extends to adjacent the arcuate shoulder 24 of the lower plate 14, but spaced sufficient distance therefrom whereby the indicia 26 is visible. The sides of the right end of the element 28 merge into a point 32. A transverse slot 34 is formed in the element 28 and the members 18 for fastening the plates 14 and 16 together extend through the slot. These members 18 limit the length of oscillatory movement that can be imparted to the member 28. The underside of the element 28 is formed so as to provide a groove 35 for receiving a piano wire 36. The left end 38 of the wire 36 protrudes into the slot 34.

An element in the form of a pointer 40 is pivotally mounted on the frame 12 between the plates 14 and 16 by a pin 42. This pin extends through the slot 34. This pointer 40 extends toward the left and is adapted to register with the indicia 26. The right side of the pointer 40 is provided with a socket 44 which receives the left end 38 of the wire 36. In a device of the size shown in FIG. 1, the socket 44 has a diameter of approximately 0.015 inch and the wire has a diameter of approximately 0.012 inch.

From the foregoing it is apparent that clockwise movement of the frame 12, with respect to the end 32 of the element 28, will effect counterclockwise movement of the pointer 40 relative to the frame, and vice versa. Thus the device can function readily as a center-of-hole locating device. To determine the location of a hole in a member, such hole being shown for illustrative purpose at 46 in a member 48, relative to another portion of the member 48 or a different member, the pointed member 28 is inserted in the hole far enough to engage the periphery of the end of the hole. Then by raising or lowering the frame through the extension 20 by a height gauge or other measuring device to a point at which the left end of the pointer registers with the center indicia, the location of the exact center of the hole can be ascertained relative to another portion of member 48 or another member, by observing the height indicated on the height gauge.

Likewise, a desired point or line can be ascertained by the present device. For example, by setting a height gauge or equivalent at a basic point on a portion of the member 48 or another member, and then by manipulating the element 28 relative to the frame 12 so that the left end of the pointer 40 registers with the center indicia, the extreme right end 32 of the element will indicate the desired point on the member, for example a point at which a hole should be drilled.

Thus it is apparent from the foregoing that by virtue of the present invention, I have provided a simple and inexpensive device for locating the center of a hole. The element 28 being tapered provides for determining the center of holes accurately regardless of diameter. Also, this simple and inexpensive device can be employed for ascertaining readily where a point, line, etc., should be relative to another point, area, surface, etc., on the same or another member.

Having described my invention, I claim:

1. An indicating device capable of relating the center of a hole to a linear gauging device comprising:

a frame comprising two plates, a pointer pivotally mounted on said frame, a work engaging element having a pointed work engaging end, said work engaging element being pivotally mounted to said frame intermediate the ends of said element, said work engaging element fixedly mounting a pointer engaging means for translating pivotal movement of said work engaging element into movements of said pointer, means for attaching said plates to one another in spaced relationship, and further characterized in that said work engaging element and said pointer engaging means are disposed between said plates, and said work engaging element is provided with a slot and said means for pivotally supporting said pointer and said means for attaching said plates to one another extend through said slot.

* * * * *